(12) United States Patent
Mathis et al.

(10) Patent No.: US 9,411,845 B2
(45) Date of Patent: Aug. 9, 2016

(54) INTEGRATION FLOW DATABASE RUNTIME

(71) Applicants: Christian Mathis, Wachenheim (DE);
Daniel Ritter, Heidelberg (DE)

(72) Inventors: Christian Mathis, Wachenheim (DE);
Daniel Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 409 days.

(21) Appl. No.: 13/916,889

(22) Filed: Jun. 13, 2013

(65) Prior Publication Data
US 2014/0372428 A1 Dec. 18, 2014

(51) Int. Cl.
*G06F 17/30* (2006.01)

(52) U.S. Cl.
CPC .... *G06F 17/30345* (2013.01); *G06F 17/30569* (2013.01)

(58) Field of Classification Search
CPC .................. G06F 17/30345; G06F 17/30569
See application file for complete search history.

(56) References Cited

U.S. PATENT DOCUMENTS

| | | | |
|---|---|---|---|
| 5,416,917 A | 5/1995 | Adair et al. | |
| 6,738,975 B1 | 5/2004 | Yee et al. | |
| 7,237,225 B2 | 6/2007 | Kompalli et al. | |
| 7,337,361 B2 | 2/2008 | Leary et al. | |
| 7,565,443 B2 | 7/2009 | Rossmanith et al. | |
| 7,689,709 B2 | 3/2010 | Surma et al. | |
| 7,788,319 B2 | 8/2010 | Schmidt et al. | |
| 8,027,922 B2 | 9/2011 | Lee | |
| 8,046,772 B2 | 10/2011 | Upton | |
| 8,290,977 B2 | 10/2012 | Chinchwadkar et al. | |
| 8,370,316 B2 | 2/2013 | Bensberg et al. | |
| 8,443,374 B2 | 5/2013 | Li et al. | |
| 8,543,653 B2 | 9/2013 | Bhatt et al. | |
| 8,595,344 B2 | 11/2013 | Bhatt et al. | |
| 8,627,337 B2 | 1/2014 | Furneaux et al. | |
| 8,739,124 B2 | 5/2014 | Ritter et al. | |
| 2004/0044986 A1* | 3/2004 | Kompalli | G06Q 30/02 717/100 |
| 2005/0257193 A1* | 11/2005 | Falk et al. | 717/109 |
| 2006/0230075 A1* | 10/2006 | Greef et al. | 707/200 |
| 2012/0089534 A1 | 4/2012 | Liebig et al. | |
| 2012/0089685 A1 | 4/2012 | Hoffmann et al. | |
| 2013/0097320 A1 | 4/2013 | Ritter et al. | |

OTHER PUBLICATIONS

Ritter, Daniel, et al.; U.S. Appl. No. 13/315,041, filed Dec. 8, 2011 entitled "Information Validation"; 105 pages.
Ritter, Daniel, et al.; U.S. Appl. No. 13/534,504, filed Jun. 27, 2012 entitled "Configuring Integration Capabilities for System Integration"; 44 pages.
Ritter, Daniel, et al.: U.S. Appl. No. 13/916,911, filed Jun. 13, 2013 entitled Generating Database Processes from Process Models; 33 pages.

* cited by examiner

*Primary Examiner* — Dinku Gebresenbet
(74) *Attorney, Agent, or Firm* — Fish & Richardson P.C.

(57) ABSTRACT

The present disclosure describes methods, systems, and computer program products for providing application integration functionality directly on a relational database according to an implementation. One computer-implemented method includes inserting relational data into a start table of a database, detecting a change in the start table, retrieving the inserted relational data from the start table, processing, using a computer, the relational data using a database integration flow runtime into result data, inserting the result data into an end table of the database, detecting a change in the end table, and retrieving the result data from the end table.

18 Claims, 9 Drawing Sheets

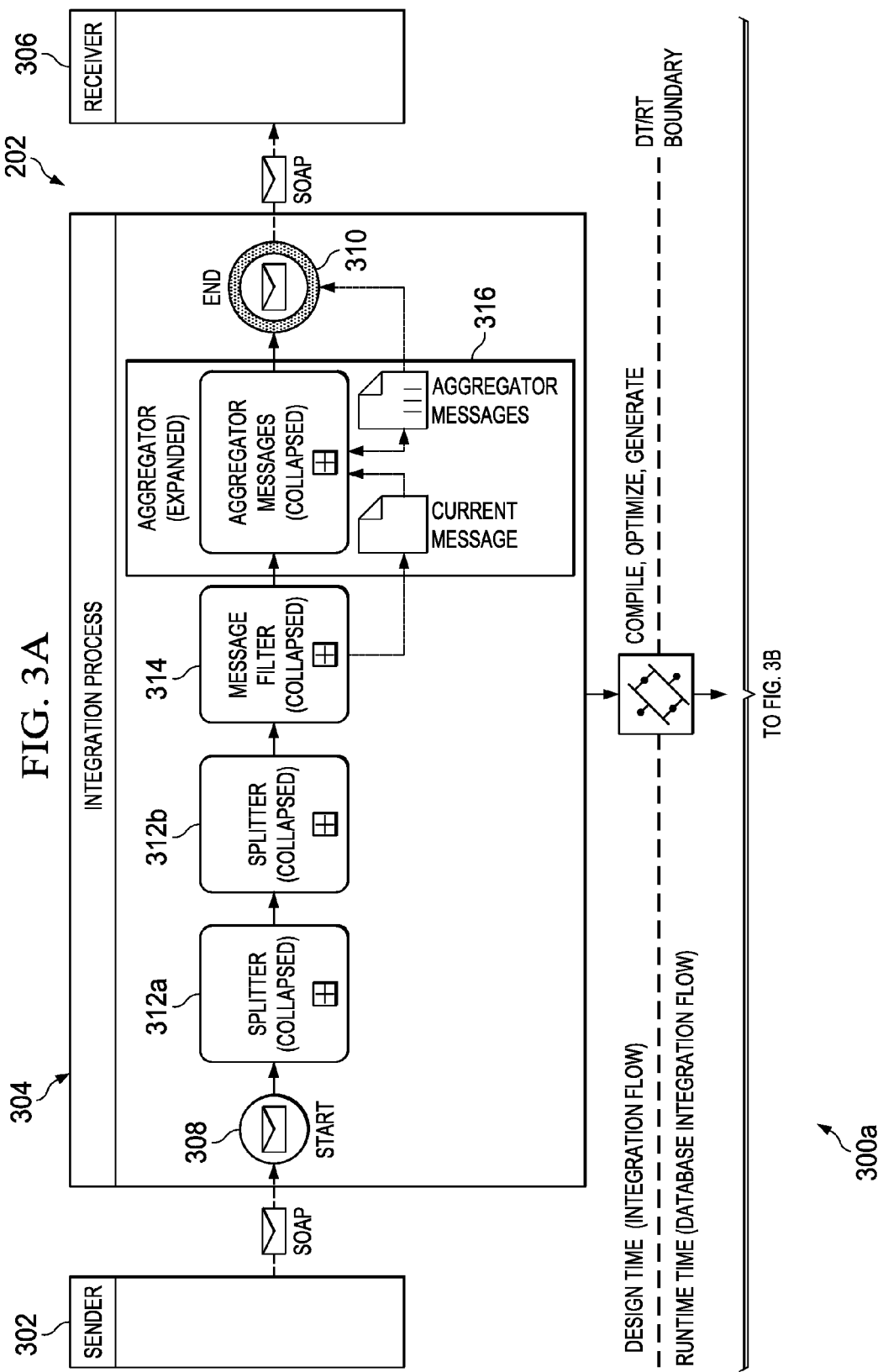

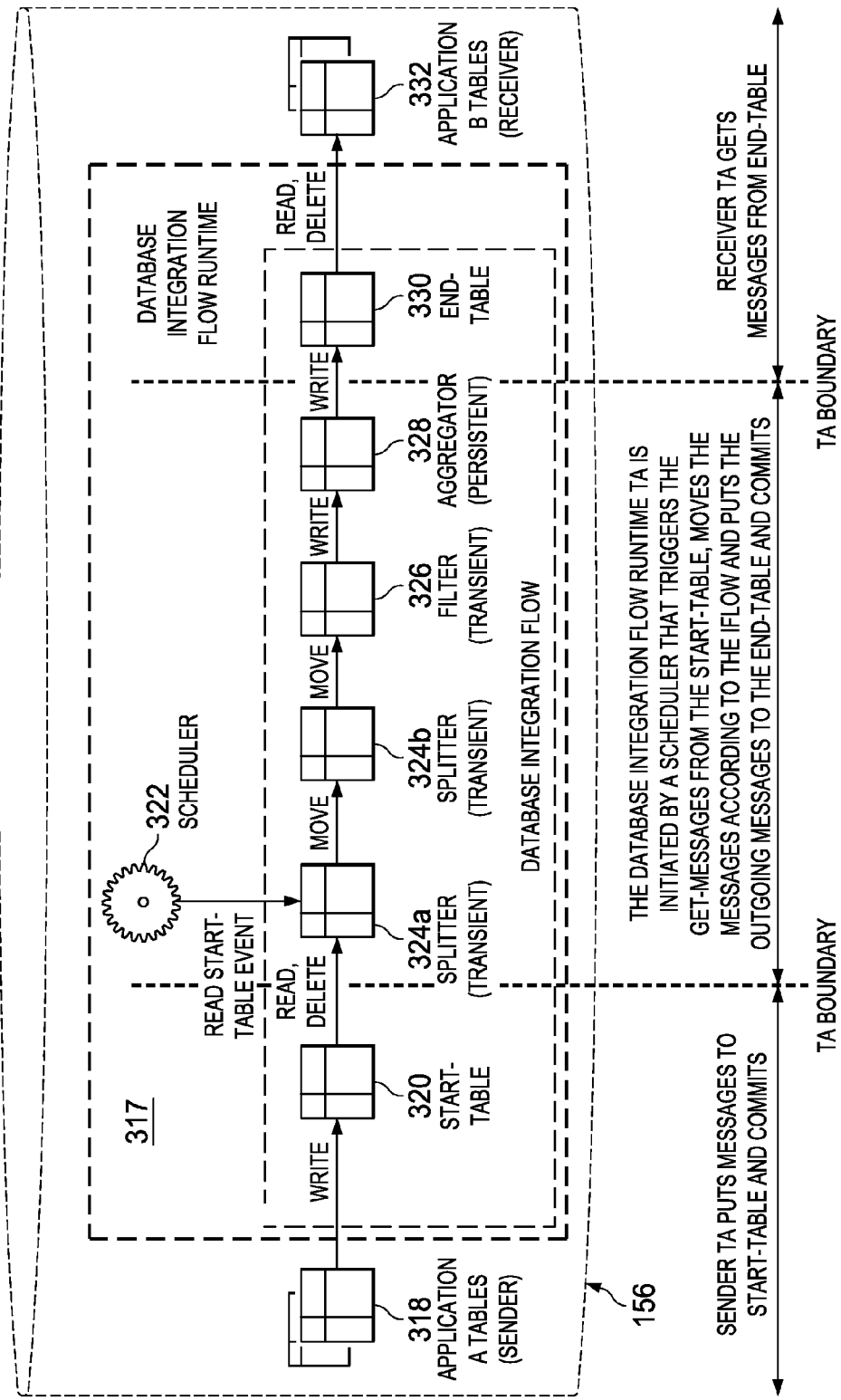

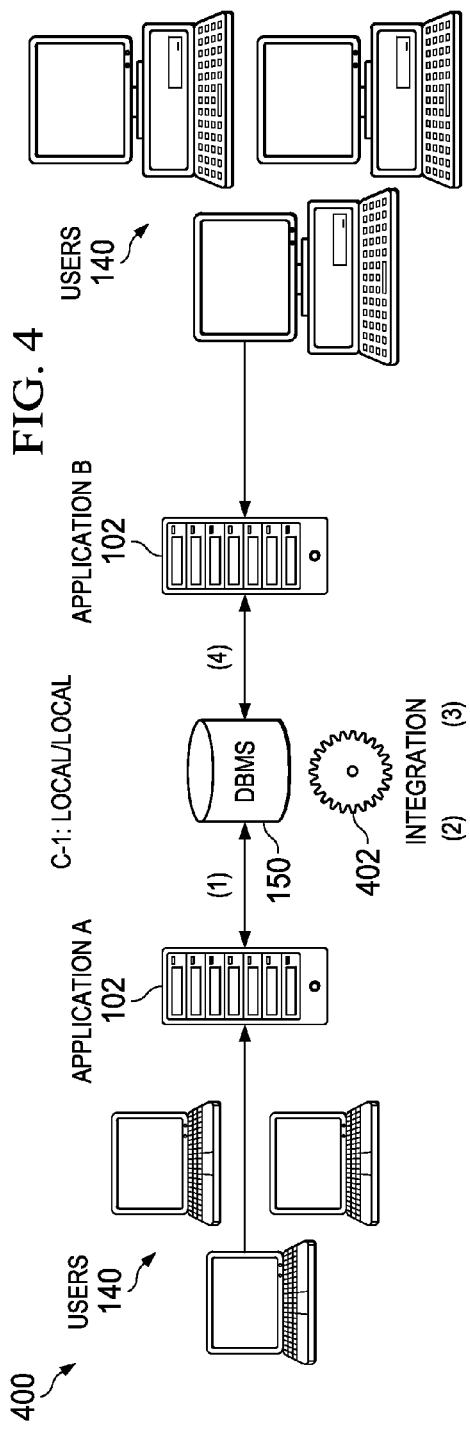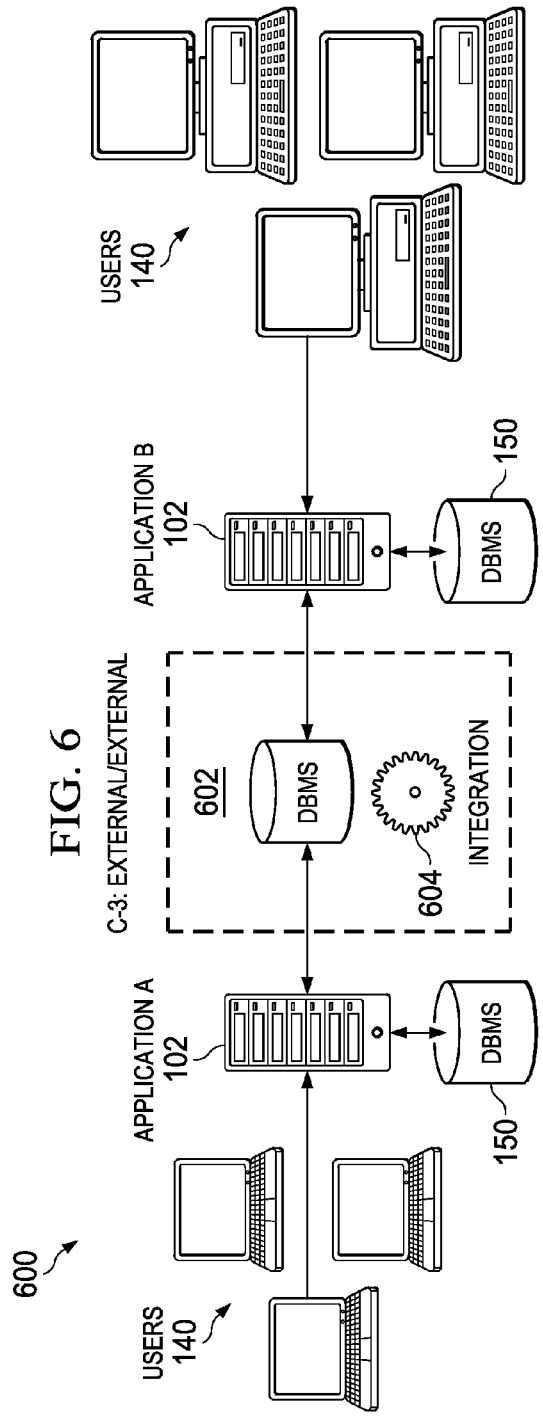

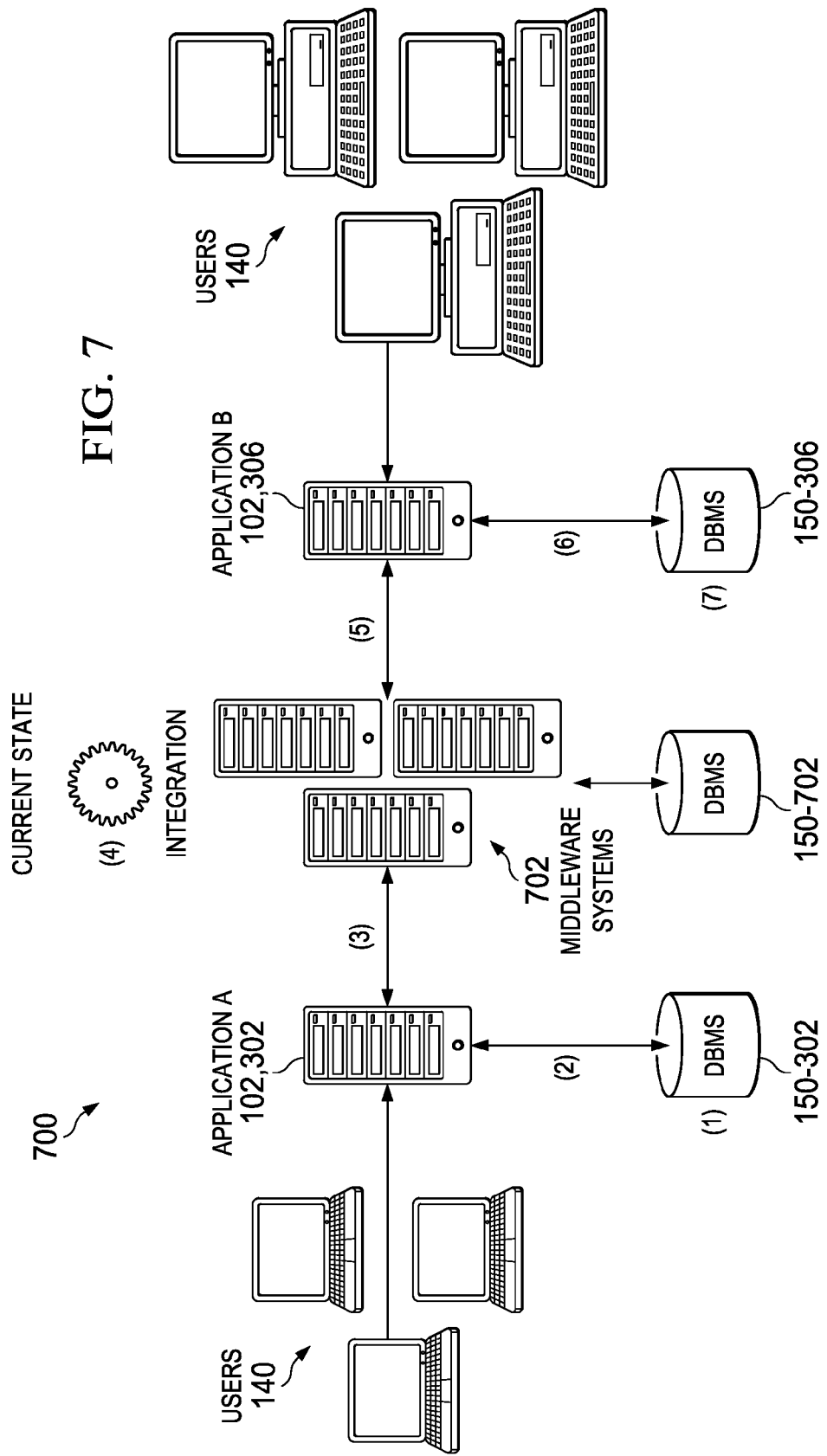

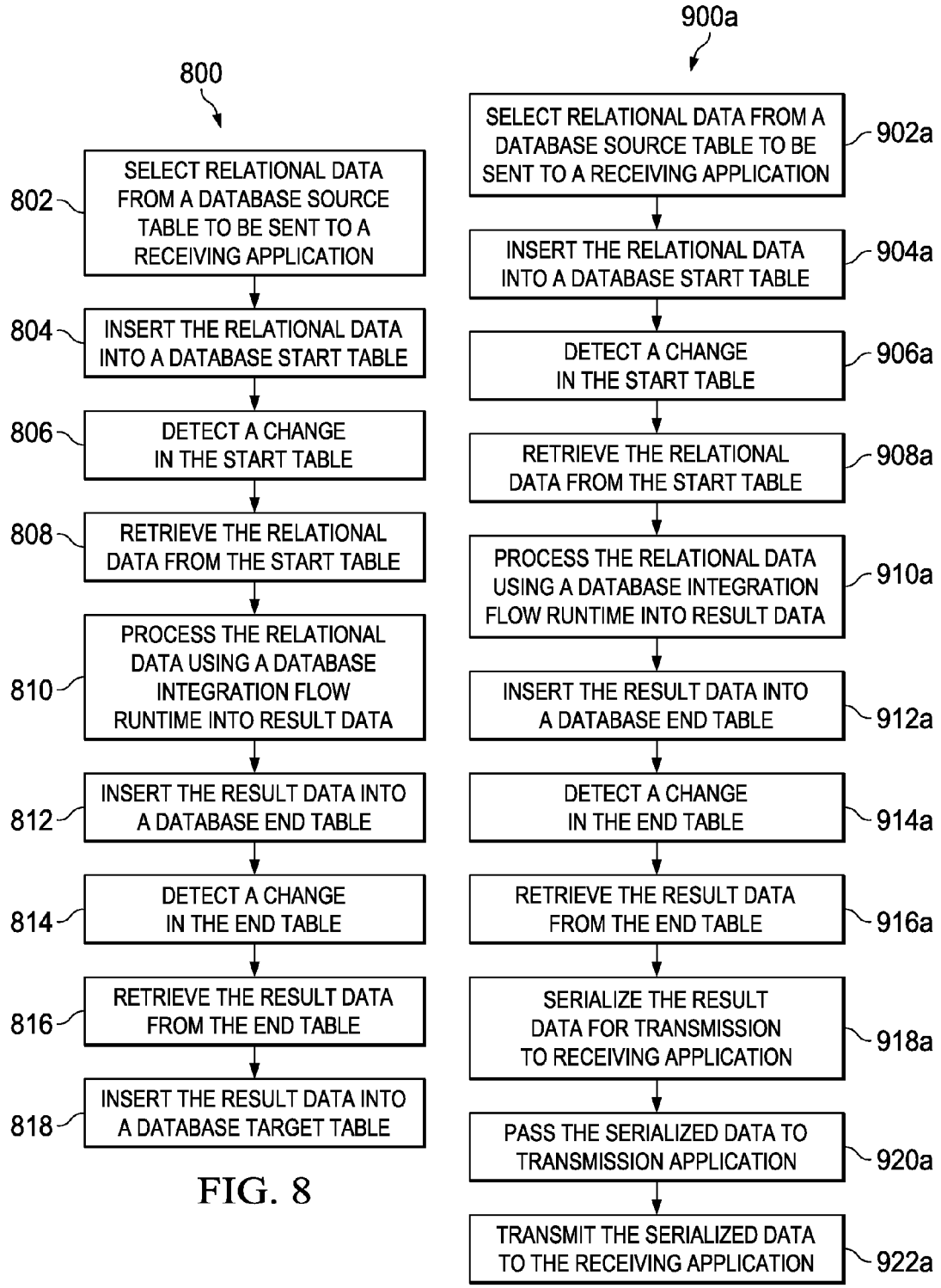

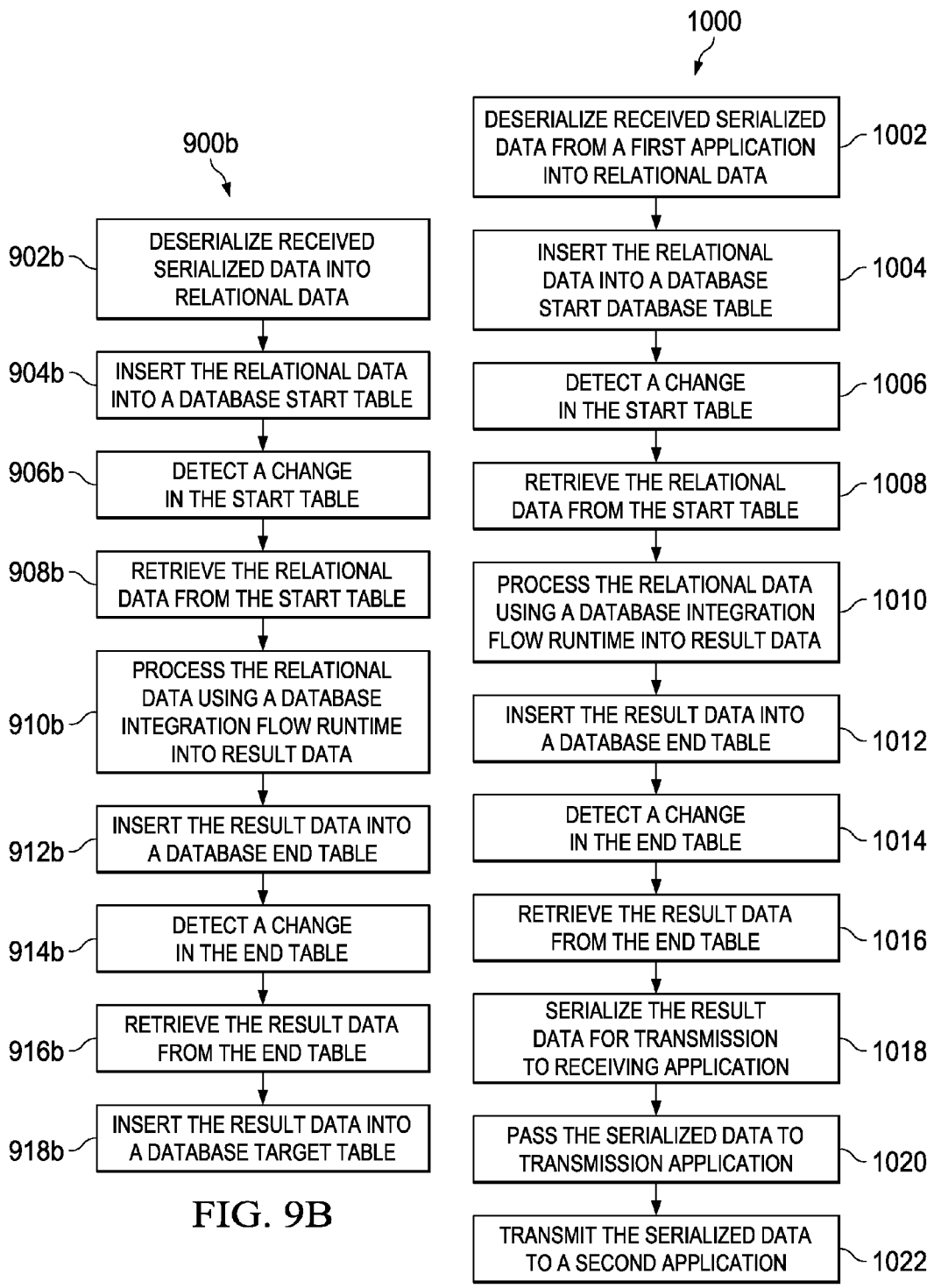

INTEGRATION FLOW DATABASE RUNTIME

BACKGROUND

Enterprise Application Integration (EAI) solutions attempt to facilitate communication between homogeneous/heterogeneous applications. The EAI solutions often use a generic data exchange (GDX) format, such as XML, as their canonical data model and an EAI solution runtime is typically message-oriented middleware (MOM) or an Enterprise Service Bus (ESB) built on top of an application server. If a system (sender) needs to send data in a message using a particular EAI solution to an application (receiver), the data may be converted multiple times between, for example, database relational format and GDX format and cross multiple system boundaries (sender database-to-application server, application server-to-EAI solution, EAI solution-to-application server, application server-to-receiver database), resulting in high resource overhead per message to the receiver. The needed software, hardware, and support as well as system complexity increase a total cost of ownership for EAI solutions for both senders and receivers.

SUMMARY

The present disclosure relates to computer-implemented methods, computer-readable media, and computer systems for providing application integration functionality directly on a relational database. One computer-implemented method includes inserting relational data into a start table of a database, detecting a change in the start table, retrieving the inserted relational data from the start table, processing, using a computer, the relational data using a database integration flow runtime into result data, inserting the result data into an end table of the database, detecting a change in the end table, and retrieving the result data from the end table.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising selecting the relational data from a source table of the database.

A second aspect, combinable with any of the previous aspects, further comprising inserting the result data into a target table of the database.

A third aspect, combinable with any of the previous aspects, further comprising serializing the result data, passing the serialized data to a transmission application, and transmitting the serialized data.

A fourth aspect, combinable with any of the previous aspects, further comprising deserializing received data into relational data.

A fifth aspect, combinable with any of the previous aspects, serializing the result data for transmission, passing the serialized data to a transmission application, and transmitting the serialized data.

The subject matter described in this specification can be implemented in particular implementations so as to realize one or more of the following advantages. First, all operations are database-internal. No system-boundaries are typically traversed and no data conversion is required between a relational format and a general data exchange (GDX) format; resulting in a lower resource footprint. In case a sender and a receiver do not share the same database system, data can be transported in relations format from the sender to the receiver database. Second, all data-intensive operations are executed in a database system where the database system acts as an integration runtime. Third, the database runtime leverages well-established database management system (DBMS) principles, such as parallel query execution and scalability for high performance, a rich set of abstract languages (sequential query language (SQL) and stored procedures) to define integration semantics, ACID principles for transactional data processing, and user/role management for access control. Fourth, a database-based integration runtime inherits some of the characteristics of the database used, including high availability, stability, persistence, and bulk processing. Fifth, the execution of application integration functionality directly on a relational database and the ability to forego the use of a dedicated application server results in a lower total cost of ownership for application integration. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 3A & 3B are block diagrams illustrating design-time and run-time aspects of a provided splitter-aggregator iFlow diagram compiled to a database according to an implementation.

FIG. 4 is a block diagram of a category 1 (C-1) integration configuration according to an implementation.

FIG. 6 is a block diagram of a category 3 (C-3) integration configuration according to an implementation.

FIG. 7 is a block diagram of a current state integration configuration according to an implementation.

FIG. 8 is a flow chart illustrating a method for providing C-1 application integration functionality (as illustrated in FIG. 4) directly on a relational database according to an implementation.

FIG. 9A is a flow chart illustrating a method for providing C-2 application outbound integration functionality (as illustrated in FIG. 5) directly on a relational database according to an implementation.

FIG. 9B is a flow chart illustrating a method for providing C-2 application inbound integration functionality (as illustrated in FIG. 5) directly on a relational database according to an implementation.

FIG. 10 is a flow chart illustrating a method for providing C-3 application integration functionality (as illustrated in FIG. 6) directly on a relational database according to an implementation.

Like reference numbers and designations in the various drawings indicate like elements.

DETAILED DESCRIPTION

Figure 1:
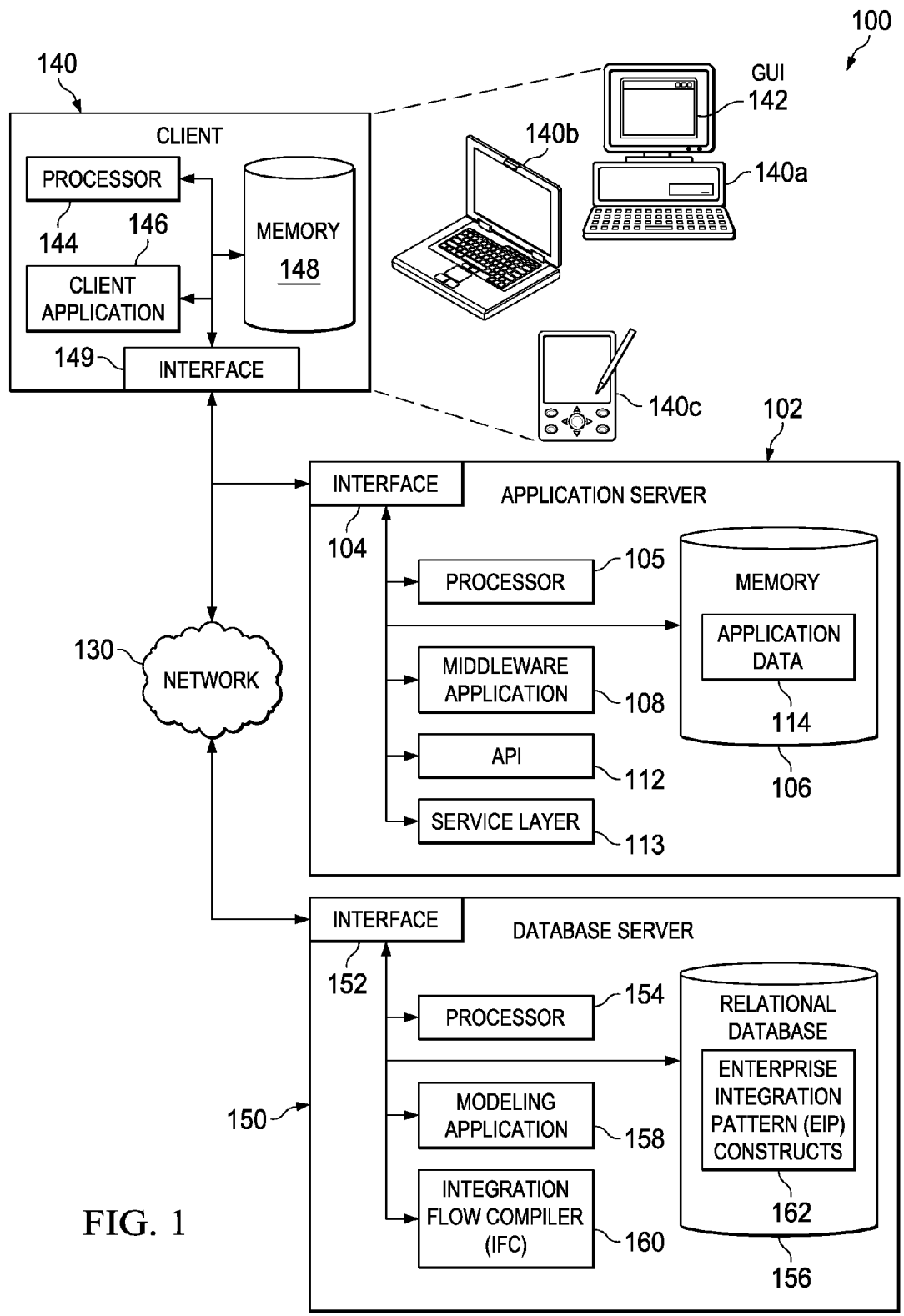
FIG. 1 is a block diagram illustrating an example distributed computing system for providing application integration functionality directly on a relational database according to an implementation.

This disclosure generally describes computer-implemented methods, computer-program products, and systems for providing application integration functionality directly on a relational database. The following description is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Enterprise Application Integration (EAI) solutions attempt to facilitate communication between homogeneous/heterogeneous applications. EAI solutions often use a generic data exchange (GDX) format, such as XML, as their canonical data model and an EAI solution runtime is typically message-oriented middleware (MOM) or an Enterprise Service Bus (ESB) built on top of an application server, if a system (sender) needs to send data in a message using a particular EAI solution to an application (receiver), multiple (simplified) processing steps are typically necessary: 1) the sender extracts sender-relational-format data to be sent from a sender database; 2) the sender converts the extracted sender-relational-format data to an EAI-compatible, GDX-formatted first message; 3) the sender passes the converted data to a particular EAI solution (which runs on its own software stack) in the EAI-compatible, GDX-formatted first message; 4) the EAI solution processes the received data retrieved from the EAI-compatible, GDX-formatted first message (e.g., transformation, receiver determination, and the like) using EAI solution logic/EAI solution database; 5) the EAI solution passes the data in a receiver-compatible, GDX-formatted second message to the receiver; 6) the receiver converts the data in the receiver-compatible, GDX-formatted second message to a receiver-compatible relational format; and 7) the receiver inserts the data into its database using the receiver-compatible relational format. In total, the data is converted twice (sender relational format-to-EAI-compatible, GDX-format and receiver-compatible, GDX-format-to-receiver relational format) and crosses four system boundaries (sender database-to-application server, application server-to-EAI solution, EAI solution-to-application server, application server-to-receiver database), resulting in high resource overhead per message to the receiver. The needed software, hardware, and support as well as system complexity increase a total cost of ownership for EAI solutions for both senders and receivers. The following described computer-implemented methods, computer-readable media, computer systems, and components of an example distributed computer system (ECDS) provide functionality to execute engineering application integration (EAI) directly on a relational database and not on an application server. In some implementations, the functionality can be provided with and/or use one or more graphical user interfaces (GUIs) providing an efficient and user-friendly data input capability and/or presentation of data provided by or communicated within the EDCS 100.

FIG. 1 is a block diagram illustrating an example distributed computing system (EDCS) 100 for providing application integration functionality directly on a relational database according to an implementation. The illustrated EDCS 100 includes or is communicably coupled with one or more application servers 102, one or more clients 140, and one or more database servers 150 that communicate across a network 130. In other implementations, other appropriate computing components can be coupled to the EDCS 100. In some implementations, the EDCS 100 can be a cloud-computing environment.

At a high level, the application server 102 is an electronic computing device within the EDCS 100 that is operable to receive, transmit, process, store, or manage data and information. According to some implementations, the application server 102 may be, include, and/or be communicably coupled with an e-mail server, a web server, a caching server, a streaming data server, and/or other suitable server. The application server 102 may operate in a cloud-based computing environment.

In general, the application server 102 is a server that stores and/or executes one or more applications 108 responsive to requests/responses sent by other application servers 102 (e.g., from a client application (described below)), clients 140, database servers 150 and/or other components (whether illustrated or not) within and communicably coupled to the illustrated EDCS 100. For example, requests/responses can, in some implementations, be messages. In some implementations, the messages can be structured according to the extensible markup language (XML) and/or other suitable format, protocol, etc. In some implementations, application server 102 can be accessed directly or using the network 130 to perform programmed tasks or operations of a particular application 108 and/or associated component (whether illustrated or not). Requests/responses may also be sent to the application server 102 from internal users, external or third-parties, other automated applications, as well as any other appropriate entities, individuals, systems, or computers (whether illustrated or not).

In some implementations, any and/or all components of the application server 102, both hardware and/or software, may interface with each other and/or the interface using an application programming interface (API) and/or a service layer (neither illustrated). The API may include specifications for routines, data structures, and object classes. The API may be either computer-language independent or dependent and refer to a complete interface, a single function, or even a set of APIs. The service layer provides software services to the EDCS 100. The functionality of the application server 102 may be accessible for all service consumers using this service layer. Software services, such as those provided by the service layer, provide reusable, defined business functionalities through a defined interface. For example, the interface may be software written in JAVA, C++, or other suitable language providing data in extensible markup language (XML) format or other suitable format. The API and/or service layer can be wholly or partial integral or stand alone in relation to the application server 102 or components of the EDCS 100. Moreover, any or all parts of the API and/or the service layer may be implemented as child or sub-modules of another software module, enterprise application, or hardware module.

The application server 102 includes an interface 104. Although illustrated as a single interface 104 in FIG. 1, two or more interfaces 104 may be used according to particular needs, desires, or particular implementations of the EDCS 100. The interface 104 is used by the application server 102 for communicating with other systems in a distributed environment—including within the EDCS 100—connected to the network 130; for example, the client 140, database server 150, as well as other systems (whether illustrated or not) that may be communicably coupled to the network 130. Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The application server 102 includes a processor 105. Although illustrated as a single processor 105 in FIG. 1, two or more processors may be used according to particular needs, desires, or particular implementations of the EDCS 100. The processor 105 executes instructions and manipulates data to perform the operations of the application server 102 and/or functionality required to provide application integration functionality directly on a relational database.

The application server 102 also includes a memory 106 that holds data for the application server 102, client 140, database server 150, and/or other components of the EDCS 100 (whether illustrated or not). Although illustrated as a single memory 106 in FIG. 1, two or more memories may be used according to particular needs, desires, or particular implementations of the EDCS 100. While memory 106 is illustrated as an integral component of the application server 102, in alternative implementations, memory 106 can be external to the application server 102 and/or the EDCS 100. In some implementations, the memory 106 includes one or more instances of application data 114.

The application 108 is any type of application that allows the client 140, database server 150, and/or other component(s) of the EDCS 100 to request, view, add, edit, delete, manage, and/or consume content obtained from/by the application server 102 in response to a received request/response. For example, the application 108 may be a portal application, a business application, and/or other suitable application consistent with this disclosure. The application 108 can also interface with other applications 108 and/or other suitable components of the EDCS 100 to wholly or partially complete a particular task. For example, the described components can provide functionality to provide and/or support application integration functionality directly on a relational database.

In some implementations, the application 108 can also be associated with application data 114, including objects and data, user profiles, processes, content provider locations, addresses, data storage locations/specifications, content lists, access requirements, and/or any other suitable data associated with an application 108. The application data 114 can be represented by any type of suitable data structure(s) and in any suitable format(s). For example, the application data 114 could be an executable module, spreadsheet, database, flat file, binary file, multi-part file, linked list, and/or the like.

Once a particular application 108 is launched, a client 140 and/or database server 150 may interactively process a task, event, or other information associated with the application server 102 associated with the application 108. Additionally, a particular application 108 may operate in response to and in connection with at least one request received from other applications 108, including applications 108 or other components (e.g., software and/or hardware modules) associated with another application server 102. In some implementations, the application 108 can be and/or include a web browser. In some implementations, each application 108 can represent a network-based application accessed and executed using the network 130 (e.g., through the Internet, or using at least one cloud-based service associated with the application 108). For example, a portion of a particular application 108 may be a web service associated with the application 108 that is remotely called, while another portion of the application 108 may be an interface object or agent bundled for processing at a remote client 140. Moreover, any or all of a particular application 108 may be a child or sub-module of another software module without departing from the scope of this disclosure. Still further, portions of the particular application 108 may be executed or accessed by a user working directly at the application server 102, as well as remotely at a corresponding client 140 and/or database server 150. In some implementations, the application server 102 or any suitable component of application server 102 or the EDCS 100 can execute the application 108.

The client 140 (e.g., 140a-140c) may be any computing device operable to connect to or communicate with at least the application server 102 using the network 130. In some implementations, the client 140 can communicate directly with the database server 150 or indirectly through another component of the EDCS 100. In general, the client 140 comprises an electronic computing device operable to receive, transmit, process, and store any appropriate data associated with the EDCS 100. Typically the client 140 will process and/or respond (both automatically and/or by manual user interaction) to requests and/or responses generated by the application server 102, for example software code received from the application 108. The client 140 can also initiate requests to the application server 102 and/or database server 150. The client 140 typically includes a client application 146, processor 144, a memory 148, and/or an interface 149.

The client application 146 is any type of application that allows the client 140 to navigate to/from, request, view, edit, delete, and or manipulate content on the client 140, for example using an HTML 5-, IOS-, or ANDROID-based application. In some implementations, the client application 146 can be and/or include a web browser. In some implementations, the client-application 146 can use parameters, metadata, and other information received at launch to access a particular set of data from the application server 102, database server 150, and/or other client 140. Once a particular client application 146 is launched, a user may interactively process a task, event, or other information associated with the application server 102, database server 150, and/or other client 140. Further, although illustrated as a single client application 146, the client application 146 may be implemented as multiple client applications in the client 140. In some implementations, the client application 146 may act as a GUI interface for the application 108, database server 150, and/or other components (whether or not illustrated) of the EDCS 100.

The interface 149 is used by the client 140 for communicating with other computing systems within the EDCS 100, using network 130. For example, the client 140 can use the interface 149 to communicate with the application server 102, database server 150, as well as other clients 140 and/or systems (not illustrated) that can be communicably coupled to the network 130. The interface 149 may be consistent with the above-described interface 104 of the application server 102 or other interfaces (whether illustrated or not) within the EDCS 100. The processor 144 may be consistent with the above-described processor 105 of the application server 102 or other processors (whether illustrated or not) within the EDCS 100. Specifically, the processor 144 executes instructions and manipulates data to perform the operations of the client 140, including the functionality required to send requests to the application server 102 and/or database server 150, and to receive and process responses from the application server 102 and/or database server. The memory 148 typically stores objects and/or data associated with the purposes of the client 140 but may also be consistent with the above-described memory 106 of the application server 102 or other memories (whether or not illustrated) within the EDCS 100, and can be used to store data similar to that stored in the other memories of the EDCS 100 for purposes such as backup, caching, and the like.

Further, the illustrated client 140 includes a GUI 142. The GUI 142 interfaces with at least a portion of the EDCS 100 for any suitable purpose, including generating a visual representation of a web browser and/or other GUI interface. The GUI 142 may be used to view and navigate among various web pages located both internally and externally to the application server 102/database server 150, view data associated with the application server 102, database server 150, and/or the client 140, or for any other suitable purpose. In particular, the GUI 142 may be used in conjunction with content from application server 102, database server 150, and/or the client 140 to provide application integration functionality directly on a relational database.

There may be any number of clients 140 associated with, or external to, the EDCS 100. For example, while the illustrated EDCS 100 includes one client 140 communicably coupled to the application server 102 and database server 150 using network 130, alternative implementations of the EDCS 100 may include any number of clients 140 suitable to the purposes of the EDCS 100. Additionally, there may also be one or more additional clients 140 external to the illustrated portion of the EDCS 100 that are capable of interacting with the EDCS 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 (some example configurations illustrated as 140a-140c) is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the application server 102 or the client 140 itself, including digital data, visual and/or audio information, or a GUI 142, as shown with respect to the client 140.

In some implementations, any and/or all components of the client 140, both hardware and/or software, may interface with each other and/or the interface using an application programming interface (API) and/or a service layer (neither illustrated). The API may include specifications for routines, data structures, and object classes. The API may be either computer-language independent or dependent and refer to a complete interface, a single function, or even a set of APIs. The service layer provides software services to the EDCS 100. The functionality of the client 140 may be accessible for all service consumers using this service layer. Software services, such as those provided by the service layer, provide reusable, defined business functionalities through a defined interface. For example, the interface may be software written in JAVA, C++, or other suitable language providing data in extensible markup language (XML) format or other suitable format. The API and/or service layer can be wholly or partial integral or stand alone in relation to the client 140 or components of the EDCS 100. Moreover, any or all parts of the API and/or the service layer may be implemented as child or sub-modules of another software module, enterprise application, or hardware module.

At a high level, the database server 150 is an electronic computing device within the EDCS 100 that is operable to receive, transmit, process, store, or manage data and information using a relational database. According to some implementations, the database server 150 may be, include, and/or be communicably coupled with an e-mail server, a web server, a caching server, a streaming data server, and/or other suitable server. The database server 150 may operate in a cloud-based computing environment.

In general, the database server 150 is a server that stores and/or executes one or more IFC compilers 158 and/or modeling applications 160 responsive to requests/responses sent by an application server 102, client 140, other database server 150 and/or other component (whether illustrated or not) within and communicably coupled to the illustrated EDCS 100. The database server 150 provides application integration functionality directly on an associated relational database 156. In some implementations, database server 150 can be accessed directly or using the network 130 to perform programmed tasks or operations of a particular IFC compiler 158, modeling application 160, and/or associated component (whether illustrated or not). Requests/responses may also be sent to the database server 150 from internal users, external or third-parties, other automated applications, as well as any other appropriate entities, individuals, systems, or computers (whether illustrated or not).

In some implementations, any and/or all components of the database server 150, both hardware and/or software, may interface with each other and/or the interface using an application programming interface (API) and/or a service layer (neither illustrated). The API may include specifications for routines, data structures, and object classes. The API may be either computer-language independent or dependent and refer to a complete interface, a single function, or even a set of APIs. The service layer provides software services to the EDCS 100. The functionality of the database server 150 may be accessible for all service consumers using this service layer. Software services, such as those provided by the service layer, provide reusable, defined business functionalities through a defined interface. For example, the interface may be software written in JAVA, C++, or other suitable language providing data in extensible markup language (XML) format or other suitable format. The API and/or service layer can be wholly or partial integral or stand alone in relation to the database server 150 or components of the EDCS 100. Moreover, any or all parts of the API and/or the service layer may be implemented as child or sub-modules of another software module, enterprise application, or hardware module.

The database server 150 includes an interface 152. Although illustrated as a single interface 152 in FIG. 1, two or more interfaces 152 may be used according to particular needs, desires, or particular implementations of the EDCS 100. The interface 152 is used by the database server 150 for communicating with other systems in a distributed environment—including within the EDCS 100—connected to the network 130; for example, the client 140, application server 102, as well as other systems (whether illustrated or not) that may be communicably coupled to the network 130. Generally, the interface 152 comprises logic encoded in software and/or hardware in a suitable combination and operable to communicate with the network 130. More specifically, the interface 152 may comprise software supporting one or more communication protocols associated with communications such that the network 130 or interface's hardware is operable to communicate physical signals within and outside of the illustrated EDCS 100.

The database server 150 includes a processor 154. Although illustrated as a single processor 154 in FIG. 1, two or more processors may be used according to particular needs, desires, or particular implementations of the EDCS 100. The processor 154 executes instructions and manipulates data to perform the operations of the database server 150 and/or functionality required to provide application integration functionality directly on a relational database.

The database server 150 also includes a relational database 156. The relational database 156 can, in some implementations, hold data for the database server 150, client 140, application server 102, and/or other components of the EDCS 100 (whether illustrated or not). In some implementations, the relational database in an in-memory database. The in-memory database 156 is a high-performance relational database management system (RDBMS) that primarily relies on volatile electronic memory, such as random access memory (RAM), as opposed to magnetic, optical, removable, or other suitable non-electronic memory, for storage, retrieval, and processing of data. The reliance on electronic memory allows, in some implementations, for near-real-time aggregation, replication, synchronization, and processing of data. In some implementations, a persistency layer ensures that a copy of the in-memory database is maintained on non-volatile magnetic, optical, removable, or other suitable non-electronic memory in the event of a power or other system failure in order to allow recovery of the in-memory database. In some implementations, the in-memory database 156 can be replicated to one or more conventional databases (not illustrated) for backup purposes. In some implementations, data from the conventional database can be replicated to and used from the in-memory database 156.

Although illustrated as a single relational database 156 in FIG. 1, two or more relational databases 156 may be used according to particular needs, desires, or particular implementations of the EDCS 100. While the relational database 156 is illustrated as an integral component of the database server 150, in alternative implementations, relational database 156 can be external to the database server 150 and/or the EDCS 100. In some implementations, the relational database 156 includes one or more instances of enterprise integration pattern (EIP) constructs 162.

An EIP construct 162 is and integration semantic, or integration flow ("iFlow"), design pattern for the use of enterprise application integration and MOM. The iFlow is a description or template for how to solve a problem (e.g., integrating two applications) that can be used in many different situations and are often formalized best practices/proven design paradigms that a software programmer implements in a particular application, process, etc. iFlows are often specified as a collaboration diagram, where a sender/receiver and the integration flow itself are participants. For example, an iFlow could be created to count words within a message supplied by a first application (sender) and to supply the result to a second application (receiver). The example iFlow could have multiple steps, each step performing a different function. In some implementations, iFlows can be described in business process modeling notation (BPMN) or other suitable notation. Although illustrated as integral to the database server 150 in FIG. 1, in alternative implementations, the EIP constructs 162 can be external to the database server 150 and/or the EDCS 100 (e.g., within a memory of the application server 102, client 140, and/or separate server (not illustrated)). Examples of EIP constructs may include content-based routing, message mapping (structure mapping), filter/split/aggregate messages (e.g., as illustrated in FIG. 3), and the like.

EIP constructs 162 are at least generated, edited, deleted, stored, and/or retrieved by a modeling application 158. The modeling application 158 provides a GUI interface for efficient user interaction with the modeling application 158 and EIP constructs 162. Although illustrated as integral to the database server 150 in FIG. 1, in alternative implementations, the modeling application 158 can be external to the database server 150 and/or the EDCS 100 (e.g., executing on the application server 102, the client 140, and/or a separate server (not illustrated)). In some implementations, the GUI interface can allow specification of a BPMN model representing integration semantics of an iFlow. In other implementations, the modeling application 158 can have an interface that receives a particular iFlow in a textual representation (e.g., program code or XML).

The integration flow compiler (IFC) 160 is any type of application that compiles iFlows into database constructs, for example database tables (storing messages and intermediate results), structured query language (SQL) statements (integration operations), stored procedures (integration operations), stored procedures (capturing user-defined code containing integration semantics), database statements (e.g., begin/commit transaction) to ensure transactional processing of the messages and to handle the lifecycle of a message, and/or stored procedures handling the lifecycle of a message. As the iFlow is expressed in database constructs, the database system itself acts as an integration runtime. Note, only integration problems that can be solved using database constructs can be executed in the database. In some implementations, iFlows can be "split" and compiled into a combination of database and non-database constructs. In some instances, a database construct can be used to trigger the non-database construct and to transmit data to/receive data from the non-database construct. Although illustrated as integral to the database server 150 in FIG. 1, in alternative implementations, the IFC 160 can be external to the database server 150 and/or the EDCS 100 (e.g., executing on the application server 102, the client 140, and/or a separate server (not illustrated)).

Figure 2:
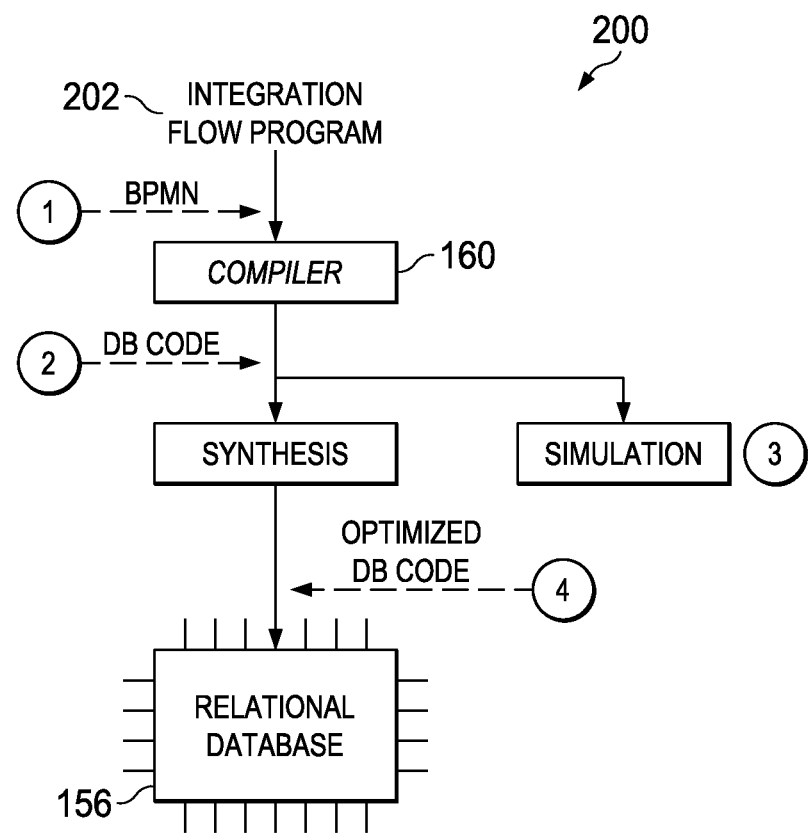
FIG. 2 is a flow chart of an example integration flow (iFlow) compilation according to an implementation.

FIG. 2 is a flow chart 200 of an example iFlow compilation according to an implementation. For clarity of presentation, the description that follows generally describes method 200 in the context of FIG. 1. However, it will be understood that method 200 may be performed, for example, by any other suitable system, environment, software, and hardware, or a combination of systems, environments, software, and hardware as appropriate. In some implementations, various steps of method 200 can be run in parallel, in combination, in loops, or in any order.

At (1), the IFC 160 receives a BPMN iFlow diagram 202. From (1), method 200 proceeds to (2).

At (2), the IFC generates a first, non-optimized version of database code to upload to the relational database, from (2), method 200 proceeds to (3).

At (3), a simulator (not illustrated in FIG. 1), can be used to check the generated, non-optimized code for errors. Example checks can include comparing existing database artifacts against the generated code artifacts, etc. If any errors are found, a user can be notified and make corrections, possibly requiring starting method 200 from (1). From (3), method 200 proceeds to (4).

At (4), a synthesizer (not illustrated in FIG. 1) optimizes correct, generated, non-optimized code into optimized code (a "database integration flow" (DIF)). The synthesizer then deploys the DIF to the relational database. After (4), method 200 stops.

In some implementations, the simulator of (3) and the synthesizer of (4) can be part of the IFC. In other implementations, the simulator and/or synthesizer can stand alone in relation to the IFC on the database server 150 and/or other component of the EDCS 100.

FIGS. 3A and 3B are block diagrams 300*a* and 300*b*, respectively, illustrating design-time and run-time aspects of a provided splitter-aggregator iFlow diagram 202 compiled to a relational database 156 according to an implementation. Referring to FIG. 3A, a received splitter-aggregator iFlow diagram 202 is illustrated as a collaboration diagram with a sender 302, integration process 304, and receiver 306. The sender 302 is shown communicating with the integration process 304 using the simple object access protocol (SOAP). The integration process 304 is also shown as communicating with the receiver 306 using SOAP. The integration process 304 is illustrated as an application to (simplified) take a received message containing text, split it into constituent words and count the number of each word. The integration processes indicates a start 308 and an end 310 to the process. Steps of the process include splitters 312*a* and 312*b*, a filter 314, and an aggregator 316.

Referring to FIG. 3B, consistent with the description of FIG. 2, the provided iFlow diagram 202 is compiled, optimized into optimized code, and the optimized code deployed to the relational database 156 as a scheduler and generated database code DIF runtime 317. Note that this example assumes that both the sender 302 (Application A) and receiver 306 (Application B) are sharing the same relational database 156 (refer to FIG. 4 below for this category (C-1)). Here, sender 302 writes data, for example one or more messages containing text, from database tables associated with Application A to a start table 320. The sender then issues a database commit. The scheduler 322 detects the change to the start table 320, triggers get messages from the start table (reads data, deletes data from the start table, and passes the data to the splitter 324*a*), moves the messages according to the DIF (324*a*→324*b*→326→328), puts outgoing messages (result data) into the end table 330, and commits the transaction. The receiver 306 detects the change to end table 330, retrieves the result data from the end table 330 and writes the retrieved result data to application B tables 332. Note that in some implementations the scheduler 322 can execute outside the database (e.g., on a separate server) as a non-database construct (see description of IFC above in relation to FIG. 1) and "listens" for new data to be written to the start table 320. In alternate implementations, the scheduler can execute on the database as a form of application server or polling application. In other implementations, the scheduler could be implemented as a database trigger or in any suitable way to permit detection of changes to the start table 320 and the start of the DIF runtime logic.

A channel represents a unidirectional, point-to-point (P2P) communication from sender 302 to receiver 306. It usually contains integration logic by chaining EIPs (e.g., 324*a*, 324*b*, 326, and 328). The channel endpoints (e.g., database start table 320 and end table 330) receive/produce messages. The channel endpoints represent entry/exit points for messages into the DIF runtime 317, capture relational message body data, and are generated by the IFC 160 as (persistent). The tables belong to the database integration flow of the DIF runtime 317. In some implementations, a body can consist of zero-to-n records/rows. The body is part of the message. Since the message is expressed in a relational model, the body is able to carry zero-to-n records/rows (of a transient/persistent table). In some implementations, if the row count is zero, an empty message is sent. Start table 320/end table 330 and the channel can be typed (e.g., if the relational model of the payload is known) or untyped (e.g., data is represented as a character large object (CLOB) and/or binary large object (BLOB)). In the illustrated example, sender 302 will fill the start table 320 with a text from its application table 318, and the receiver 306 will read from the end table 330 the result of the DIF runtime 317.

To decouple the sender 302/receiver 306 and the DIF runtime 317, each participant has its own transaction context: The sender 302 puts a message on a channel by generating a new message instance and inserting the payload into a start table 320 (a ID/text combination in our example). The sender 302 then commits its transaction T(S) to make the new message visible to the DIF runtime 317 (left TA-boundary in FIG. 3). The DIF runtime 317 employs another transaction T(R) to process the message. T(R) removes the message from the start table 320, does the processing, and finally writes the result message (as result data) to the end table 330 (the resulting ID/bag-of-words mapping). T(R) commits the transaction to make the message visible to the receiver 306 (right TA-boundary in FIG. 4). The receiver 306 takes the message from the channel by removing the payload from the end table 330 and "cleaning up" entries from the message tables. The receiver 306 then commits its transaction T(E). Transactional decoupling among the participants ensures that channel processing does not affect application transactions. The IFC 160 generates stored procedures for Applications A and B (associated with sender 302 and receiver 306, respectively) to simplify the send/receive process and to avoid access to runtime-internal tables. These procedures also create/remove entries in/from message/header/attachment tables.

The relational database 156 constructs generated by the IFC 160 result in a pipeline that implements message store-and-forward processing (see below). A pipeline represents a message channel and consists of an ordered set of processing functions (e.g., filter, and mapping), relations (e.g., routing, broadcasting) and result sets of those functions. The result sets of a function or relation can be the input to the next function. The sequence of functions and result sets form the message channel. A database pipeline is an IFC-generated implementation of a message channel. For its implementation stored procedures and SQL are used for the following two purposes: (1) to express/execute integration semantics of the iFlow diagram 202 for which the pipeline was generated; and (2) to handle the lifecycle of a message (see below). The result sets of processing functions or relations can be transient/persistent database tables. In some implementations, functions and relations are relational algebra operators and produce result sets compliant with a suitable database message format.

Start and end tables, 320 and 330 respectively, are native persistence points. Messages are moved along the pipeline from one persistence point to the next. An example message lifecycle can be: (1) a runtime transaction (T) reads a message from a persistence point (source table) and processes the message (by executing the functions and relations on the pipeline) until the next persistence point (target table) is reached (implemented by a stored procedure, purpose P1 in the previous section). Intermediate results can be captured in transient tables (e.g., "move" as in FIG. 3). T stores the result message in a persistent target table (e.g., "write" as in FIG. 3) and removes the corresponding message from the persistent source table (e.g., "read/delete" as in FIG. 3). T then commits to make the change visible. This is implemented in a "lifecycle procedure" (see purpose (2) above).

Transactional processing ensures that in any point in time, a message is stored exactly in one persistence point (as seen from an observing transaction T). Transactional processing also ensures the recoverability of the system: In-flight messages (currently in progress on the channel) are automatically rolled back to a consistent state (to the last persistence point, e.g., in the start table 320) in case of a DB crash. EIPs on the channel might define further persistence points (e.g., for monitoring) that result in persistent channel tables. By default, IFC 160 tries to use transient (in-memory) tables for intermediate results to reduce writes to the persistent store (as illustrated in FIG. 3).

The IFC 160 makes use of the access control capabilities of the relational database 156 to control access to application and runtime tables. In the provided example, Application A (sender 302) has access to its own tables and write access to the start table 320. Application B (receiver 306) has access to its own tables and read/delete access on the end table 330. Remaining tables belong to the DIF runtime 317 and neither application A nor application B has access. In some implementations, the DIF runtime 317 can be accessed by an IFC 160 administrator.

Since a channel is an abstract construct, the IFC 160 has freedom to generate a relational database-156 specific implementation for the channel. The IFC 160 generates code that processes messages in bulk mode for which a database system is the ideal runtime. Furthermore the IFC 160 can create multiple incarnations of the same channel to scale-out channel processing, if necessary. As will be apparent to those of skill in the art, further system-relevant characteristics such as stability, high availability, can be inherited from the relational database 156.

FIG. 4 is a block diagram of a category 1 (C-1) integration configuration 400 according to an implementation. This configuration is designated as "local"/"local" in that both the sender/receiver applications on associated application servers 102 reside in the same business system and share a common (local) relational database system 150 but not the same schema. The C-1 configuration can potentially occurs with business software suites, where hundreds or thousands of applications are implemented on a similar 3-tier software stack with a single relational database system 150 in a back-end environment. The gearwheel 402 depicts the location of integration semantics processing in the database system, which is shared by the sending and receiving applications on associated application server 102. All operations are relational database-local.

If a sender application, for example Application A, needs to send data to a receiver application, for example Application B, that uses the same relational database system 156, the following steps occur: 1) the sender selects the relational data to be sent and inserts the data into a database table; 2) a DIF on the relational database system 150 picks up the data from the database table and processes it (transformation, routing, etc.); 3) the DIF writes the data into a database table known by the receiver Application B; 4) the receiver Application B reads the relational data and inserts the data into its own database tables. All operations are relational database-internal. Note that no system-boundaries are traversed, no data conversion (to/from XML or other suitable messaging format) is required, no protocol transformations are necessary, and no non-relational operations need to be executed.

Figure 5:
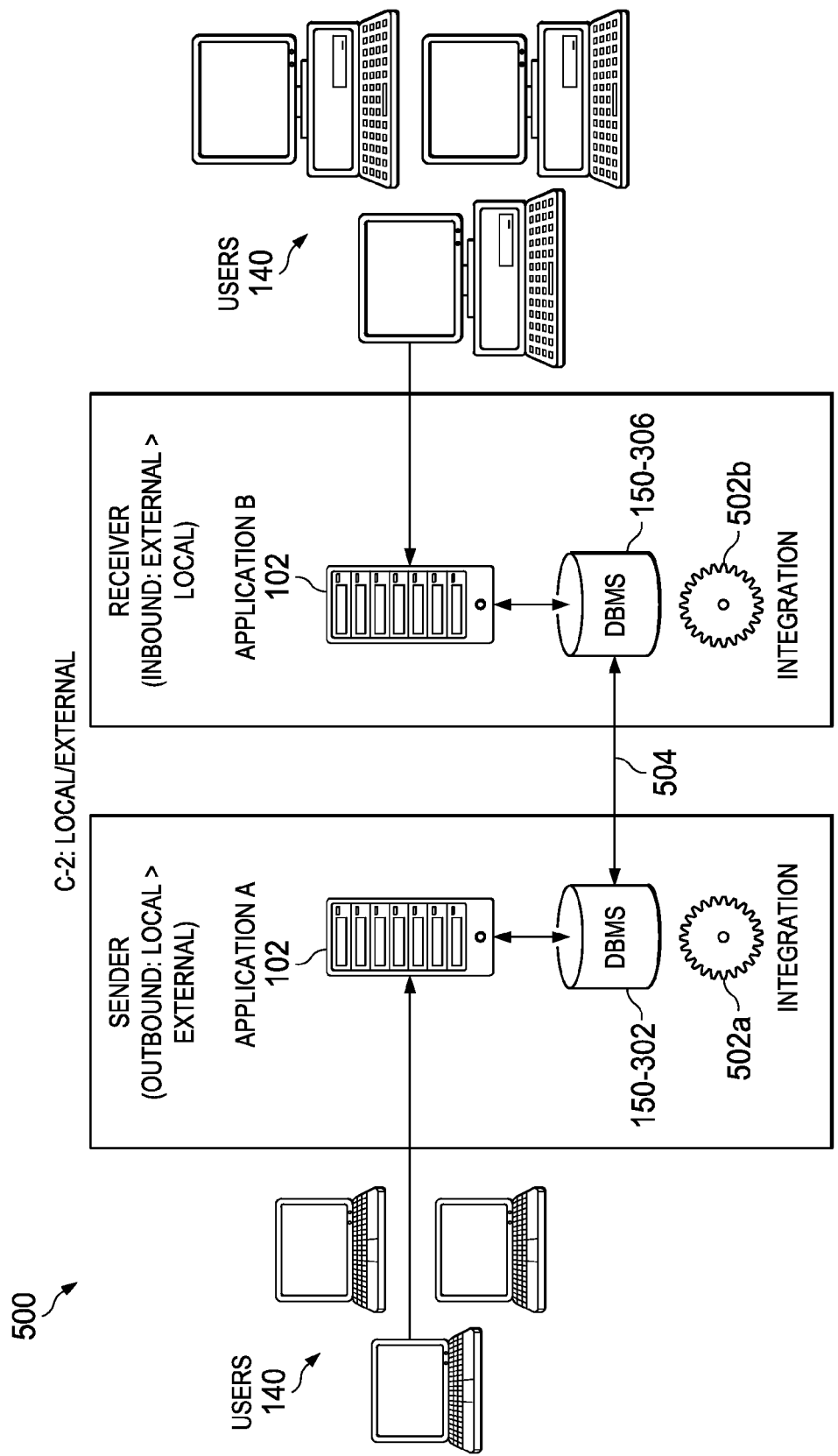
FIG. 5 is a block diagram of a category 2 (C-2) integration configuration according to an implementation.

FIG. 5 is a block diagram of a category 2 (C-2) integration configuration 500 according to an implementation. This configuration is designated as "local"/"external" or "external"/"local" in that an application (either sender 302 or receiver 306) needs to access "external" data. For example, a business application (Application B) analyzes social network feeds sent from sender 302/Application A for social sentiment analysis. Sender 302 and receiver 306 do not share the same relational database system as each have their own relational database system, 150-302/150-306 respectively. The C-2 configuration uses a DIF runtime (see 317 and discussion related to FIG. 3) on each of the sender 150-302 (outbound) and receiver 150-306 (inbound) associated relational database systems. The gearwheels 502a/502b depict the location of integration semantics processing in the relational database systems 150-302/150-306 for sender 302/receiver 306, respectively. Data is transported 504 (in relational format) from the sender 302 relational database system 150 to the receiver 306 relational database system 150. All operations (except data transport 504 between relational database systems—by message, etc.) are relational database-local.

FIG. 6 is a block diagram of a category 3 (C-3) integration configuration 600 according to an implementation. This configuration is designated as "external"/"external" in that an application (either sender 302 or receiver 306) needs to access data present on a non-local relational database system associated with another application. As in the C-2 configuration, sender 302 and receiver 306 do not share the same relational database system as each have their own relational database system. The sender 302/receiver 306 applications reside on different systems and communication is mediated by a dedicated integration database system 602. The gearwheel 604 depicts the location of integration semantics processing in the mediating dedicated integration database system 602. In this configuration, the dedicated integration database system 602 can act as MOM but be more efficient than first processing messages using an application, application server, and/or the like prior to utilizing a relational database 156. Here, the dedicated integration database system 602 can directly handle messages. In some implementations, certain functionally can be designated to be handled by the dedicated integration database system 602, for example database-intensive integration scenarios, monitoring and alerting, etc. while remaining non-database-intensive functionality can be handled by an application, application server, and/or the like.

Configurations C-1, C2, and C-3 illustrate uses of DIF runtimes for integration functionality. In some implementations, the use of DIF runtimes can replace or be complementary to existing EAI solutions (e.g., MOM systems) for particular database-intensive/database-appropriate functionality by removing all or some need for application-server-based integration functionality.

FIG. 7 is a block diagram of a current state integration configuration 700 according to an implementation. For an Application A (sender) 102-302 needs to send data in a message using a particular EAI solution to an Application B (receiver) 102-306, the following (simplified) processing steps are typically necessary: 1) the sender 102-302 extracts sender-relational-format data to be sent from a sender database 150-302; 2) the sender 102-302 converts the extracted sender-relational-format data to an EAI-compatible, GDX-formatted first message; 3) the sender 102-302 passes the converted data to a particular EAI solution 702 (which runs on its own software stack) in the EAI-compatible, GDX-formatted first message; 4) the EAI solution 702 processes the received data retrieved from the EAI-compatible, GDX-formatted first message (e.g., transformation, receiver determination, and the like) using EAI solution logic/EAI solution database 150-702; 5) the EAI solution 702 passes the data in a receiver-compatible, GDX-formatted second message to the receiver 102-306; 6) the receiver 102-306 converts the data in the receiver-compatible, GDX-formatted second message to a receiver-compatible relational format; and 7) the receiver 102-306 inserts the data into its database 150-306 using the receiver-compatible relational format. In total, the data is converted twice (sender relational format-to-EAI-compatible, GDX-format and receiver-compatible, GDX-format-to-receiver relational format) and crosses four system boundaries (sender database-to-application server, application server-to-EAI solution, EAI solution-to-application server, application server-to-receiver database), resulting in high resource overhead per message to the receiver.

FIG. 8 is a flow chart illustrating a method 800 for providing C-1 application integration functionality (as illustrated in FIG. 4) directly on a relational database according to an implementation. For clarity of presentation, the description that follows generally describes method 800 in the context of FIGS. 1-7. However, it will be understood that method 800 may be performed, for example, by any other suitable system, environment, software, and hardware, or a combination of systems, environments, software, and hardware as appropriate. In some implementations, various steps of method 800 can be run in parallel, in combination, in loops, or in any order.

At 802, relational data from a source table on a database and associated with a sending first application is selected to be sent to a receiving second application. The second application has access to the same database. From 802, method 800 proceeds to 804.

At 804, the selected relational data is inserted into a database start table on the database. In some implementations, the sending application issues a commit operation to make the relational data visible to the database integration flow (DIF) runtime. From 804, method 800 proceeds to 806.

At 806, the change to the start table is detected. For example, a scheduling application (internal and/or external to the database) can "listen" to detect the change to the start table. In other implementations, a database trigger can be used. In still other implementations, a polling application (internal and/or external to the database) could poll the database start table for changes. As will be appreciated by those of skill in the art, any suitable detection method may be used to detect the change to the start table. From 806, method 800 proceeds to 808.

At 808, the relational data inserted into the start table is retrieved. For example the scheduler could issue get operations to retrieve the relational data. In some implementations, the retrieved relational data is deleted from the start table once retrieved. The retrieved relational data is passed to the DIF runtime. From 808, method 800 proceeds to 810.

At 810, The relational data is processed accordingly by the DIF runtime (e.g., as illustrated by the FIG. 3 splitter/aggregator DIF runtime) into result data. From 810, method 800 proceeds to 812.

At 812, the result data is inserted into a database end table for access by the receiving application. In some implementations, the DIF runtime issues a commit operation. From 812, method 800 proceeds to 814.

At 814, the receiving application detects a change in the end table. In some implementations, the receiving application can use detection methods similar to that at 806 and/or any other suitable method. From 814, method 800 proceeds to 816.

At 816, the receiving application retrieves the result data from the end table. In some implementations, the result data is deleted from the end table once retrieved. From 816, method 800 proceeds to 818.

At 818, the receiving application inserts the retrieved result data into a target database table associated with the receiving application. After 818, method 800 stops.

FIG. 9A is a flow chart illustrating a method 900a for providing C-2 application outbound integration functionality (as illustrated in FIG. 5) directly on a relational database according to an implementation. For clarity of presentation, the description that follows generally describes method 900a in the context of FIGS. 1-8. However, it will be understood that method 900a may be performed, for example, by any other suitable system, environment, software, and hardware, or a combination of systems, environments, software, and hardware as appropriate. In some implementations, various steps of method 900a can be run in parallel, in combination, in loops, or in any order.

At 902a, relational data from a source table on a database and associated with a sending first application is selected to be sent to a receiving second application. From 902a, method 900a proceeds to 904a.

At 904a, the selected relational data is inserted into a database start table on the database. In some implementations, the sending application issues a commit operation to make the relational data visible to the database integration flow (DIF) runtime. From 904a, method 900a proceeds to 906a.

At 906a, the change to the start table is detected. For example, a scheduling application (internal and/or external to the database) can "listen" to detect the change to the start table. In other implementations, a database trigger can be used. In still other implementations, a polling application (internal and/or external to the database) could poll the database start table for changes. As will be appreciated by those of skill in the art, any suitable detection method may be used to detect the change to the start table. From 906a, method 900a proceeds to 908a.

At 908a, the relational data inserted into the start table is retrieved. For example the scheduler could issue get operations to retrieve the relational data. In some implementations, the retrieved relational data is deleted from the start table once retrieved. The retrieved relational data is passed to the DIF runtime. From 908a, method 900a proceeds to 910a.

At 910a, The relational data is processed accordingly by the DIF runtime (e.g., as illustrated by the FIG. 3 splitter/aggregator DIF runtime) into result data. From 910a, method 900a proceeds to 912a.

At 912a, the result data is inserted into a database end table to be sent to the receiving application. In some implementations, the DIF runtime issues a commit operation. From 912a, method 900a proceeds to 914a.

At 914a, a change is detected in the end table. In some implementations, detection methods similar to that at 906 and/or any other suitable method can be used. From 914a, method 900a proceeds to 916a.

At 916a, the result data is retrieved from the end table. In some implementations, the result data is deleted from the end table once retrieved. From 916a, method 900a proceeds to 918a.

At 918*a*, the retrieved relational data is serialized into a generic data exchange (GDX) format. In other implementations, any suitable format, structure, etc. can be used to package the relational data for transmission. From 918*a*, method 900*a* proceeds to 920*a*.

At 920*a*, the serialized data is passed to a transmission application (e.g., a sending-application-associated message-oriented middleware (MOM) or enterprise service bus (ESB) (not illustrated in FIG. 5)) for transmission to the receiving application. From 920*a*, method 900*a* proceeds to 922*a*.

At 922*a*, the transmission application transmits the serialized data to the receiving application. After 922*a*, method 900*a* stops.

FIG. 9B is a flow chart illustrating a method 900*b* for providing C-2 application inbound integration functionality (as illustrated in FIG. 5) directly on a relational database according to an implementation. For clarity of presentation, the description that follows generally describes method 900*b* in the context of FIGS. 1-9A. However, it will be understood that method 900*b* may be performed, for example, by any other suitable system, environment, software, and hardware, or a combination of systems, environments, software, and hardware as appropriate. In some implementations, various steps of method 900*b* can be run in parallel, in combination, in loops, or in any order.

At 902*b*, serialized data is received by a reception application (e.g., a receiving-application-associated MOM/ESB (not illustrated in FIG. 5)). The received serialized data is deserialized into a relational format by the reception application. From 902*b*, method 900*b* proceeds to 904*b*.

At 904*b*, the relational data is inserted into a database start table on the receiving application database. In some implementations, the reception application issues a commit operation to make the relational data visible to the database integration flow (DIF) runtime. From 904*b*, method 900*b* proceeds to 906*b*.

At 906*b*, the change to the start table is detected. For example, a scheduling application (internal and/or external to the database) can "listen" to detect the change to the start table. In other implementations, a database trigger can be used. In still other implementations, a polling application (internal and/or external to the database) could poll the database start table for changes. As will be appreciated by those of skill in the art, any suitable detection method may be used to detect the change to the start table. From 906*b*, method 900*b* proceeds to 908*b*.

At 908*b*, the relational data inserted into the start table is retrieved. For example the scheduler could issue get operations to retrieve the relational data. In some implementations, the retrieved relational data is deleted from the start table once retrieved. The retrieved relational data is passed to the DIF runtime. From 908*b*, method 900*b* proceeds to 910*b*.

At 910*b*, The relational data is processed accordingly by the DIF runtime (e.g., as illustrated by the FIG. 3 splitter/aggregator DIF runtime) into result data. From 910*b*, method 900*b* proceeds to 912*b*.

At 912*b*, the result data is inserted into a database end table for access by the receiving application. In some implementations, the DIF runtime issues a commit operation. From 912*b*, method 900*b* proceeds to 914*b*.

At 914*b*, the receiving application detects a change in the end table. In some implementations, the receiving application can use detection methods similar to that at 906 and/or any other suitable method. From 914*b*, method 900*b* proceeds to 916*b*.

At 916*b*, the receiving application retrieves the result data from the end table. In some implementations, the result data is deleted from the end table once retrieved. From 916*b*, method 900*b* proceeds to 918*b*.

At 918*b*, the receiving application inserts the retrieved result data into a target database table on the receiving application database. After 918*b*, method 900*b* stops.

FIG. 10 is a flow chart illustrating a method 1000 for providing C-3 application integration functionality (as illustrated in FIG. 6) directly on a relational database according to an implementation. For clarity of presentation, the description that follows generally describes method 1000 in the context of FIGS. 1-8 and 9A-9B. However, it will be understood that method 1000 may be performed, for example, by any other suitable system, environment, software, and hardware, or a combination of systems, environments, software, and hardware as appropriate. In some implementations, various steps of method 1000 can be run in parallel, in combination, in loops, or in any order.

At 1002, serialized data is received from a first application by a reception application (e.g., a MOM/ESB (not illustrated in FIG. 6))). The received serialized data is deserialized into a relational format. From 1002, method 1000 proceeds to 1004.

At 1004, the relational data is inserted into a database start table on the receiving application database. In some implementations, the reception application issues a commit operation to make the relational data visible to the database integration flow (DIF) runtime. From 1004, method 1000 proceeds to 1006.

At 1006, the change to the start table is detected. For example, a scheduling application (internal and/or external to the database) can "listen" to detect the change to the start table. In other implementations, a database trigger can be used. In still other implementations, a polling application (internal and/or external to the database) could poll the database start table for changes. As will be appreciated by those of skill in the art, any suitable detection method may be used to detect the change to the start table. From 1006, method 1000 proceeds to 1008.

At 1008, the relational data inserted into the start table is retrieved. For example the scheduler could issue get operations to retrieve the relational data. In some implementations, the retrieved relational data is deleted from the start table once retrieved. The retrieved relational data is passed to the DIF runtime. From 1008, method 1000 proceeds to 1010.

At 1010, the relational data is processed accordingly by the DIF runtime (e.g., as illustrated by the FIG. 3 splitter/aggregator DIF runtime) into result data. From 1010, method 1000 proceeds to 1012.

At 1012, the result data is inserted into a database end table for access by the receiving application. In some implementations, the DIF runtime issues a commit operation. From 1012, method 1000 proceeds to 1014.

At 1014, the receiving application detects a change in the end table. In some implementations, the receiving application can use detection methods similar to that at 1006 and/or any other suitable method. From 1014, method 1000 proceeds to 1016.

At 1016, the receiving application retrieves the result data from the end table. In some implementations, the result data is deleted from the end table once retrieved. From 1016, method 1000 proceeds to 1018.

At 1018, the retrieved relational data is serialized into a generic data exchange (GDX) format. In other implementations, any suitable format, structure, etc. can be used to package the relational data for transmission. From 1018, method 1000 proceeds to 1020.

At 1020, the serialized data is passed to a transmission application (e.g., a MOM/ESB (not illustrated in FIG. 6)) for transmission to a second application. From 1020, method 1000 proceeds to 1022.

At 1022, the transmission application transmits the serialized data to the second application. After 1022, method 1000 stops.

Although the concepts herein have been described primarily in terms of an in-memory database, the use of in-memory database technologies describe only one possible implementation and is not intended to limit the disclosure in any way. Those of skill in the art will appreciate that various non-in-memory database technologies can be substituted and appropriate changes made to the described technology without deviating from the spirit and scope of the disclosure. The present disclosure is not intended to be limited to the described and/or illustrated implementations, but is to be accorded the widest scope consistent with the principles and features disclosed herein.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDFLOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:
1. A computer-implemented method comprising:
   inserting relational data associated with a sending application and selected for sending to a receiving application into a start table of a database, the sending application having access to the database;
   detecting a change in the start table;
   retrieving the inserted relational data from the start table;

processing, using a computer, the relational data using a database integration flow runtime that compiles an integration design pattern into database constructs for converting the relational data into result data;
inserting the result data into an end table of the database;
detecting a change in the end table; and
retrieving the result data from the end table.

2. The method of claim 1, further comprising selecting the relational data from a source table of the database.

3. The method of claim 1, further comprising inserting the result data into a target table of the database.

4. The method of claim 1, further comprising:
serializing the result data;
passing the serialized data to a transmission application; and
transmitting the serialized data.

5. The method of claim 3, further comprising deserializing received data into relational data.

6. The method of claim 5, further comprising:
serializing the result data for transmission;
passing the serialized data to a transmission application; and
transmitting the serialized data.

7. A non-transitory, computer-readable medium storing computer-readable instructions executable by a computer to:
insert relational data associated with a sending application and selected for sending to a receiving application into a start table of a database, the sending application having access to the database;
detect a change in the start table;
retrieve the inserted relational data from the start table;
process the relational data using a database integration flow runtime that compiles an integration design pattern into database constructs for converting the relational data into result data;
insert the result data into an end table of the database;
detect a change in the end table; and
retrieve the result data from the end table.

8. The medium of claim 7, further comprising instructions to select the relational data from a source table of the database.

9. The medium of claim 7, further comprising instructions to insert the result data into a target table of the database.

10. The medium of claim 7, further comprising instructions to:
serialize the result data;
pass the serialized data to a transmission application; and
transmit the serialized data.

11. The medium of claim 9, further comprising instructions to deserialize received data into relational data.

12. The medium of claim 11, further comprising instructions to:
serialize the result data for transmission;
pass the serialized data to a transmission application; and
transmit the serialized data.

13. A computer-implemented system comprising:
a memory configured to hold a database integration flow runtime;
a processor interoperably coupled with the memory and configured to perform operations comprising:
insert relational data associated with a sending application and selected for sending to a receiving application into a start table of a database, the sending application having access to the database;
detect a change in the start table;
retrieve the inserted relational data from the start table;
process the relational data using the database integration flow runtime that compiles an integration design pattern into database constructs for converting the relational data into result data;
insert the result data into an end table of the database;
detect a change in the end table; and
retrieve the result data from the end table.

14. The system of claim 13, further configured to select the relational data from a source table of the database.

15. The system of claim 13, further configured to insert the result data into a target table of the database.

16. The system of claim 13, further configured to:
serialize the result data;
pass the serialized data to a transmission application; and
transmit the serialized data.

17. The system of claim 15, further configured to deserialize received data into relational data.

18. The system of claim 17, further configured to:
serialize the result data for transmission;
pass the serialized data to a transmission application; and
transmit the serialized data.

* * * * *